(No Model.) 2 Sheets—Sheet 1.
F. A. WHITNEY.
GATE.
No. 538,307. Patented Apr. 30, 1895.
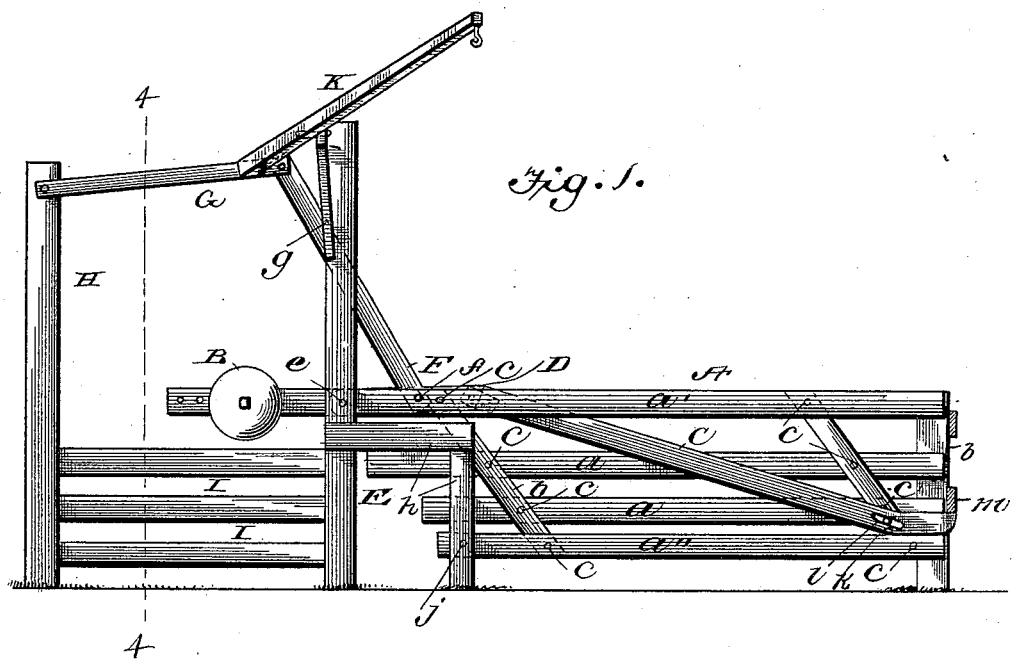
Witnesses
Inventor
Frank A. Whitney
By Bondet Johns Pickard Jackson
his Attorneys

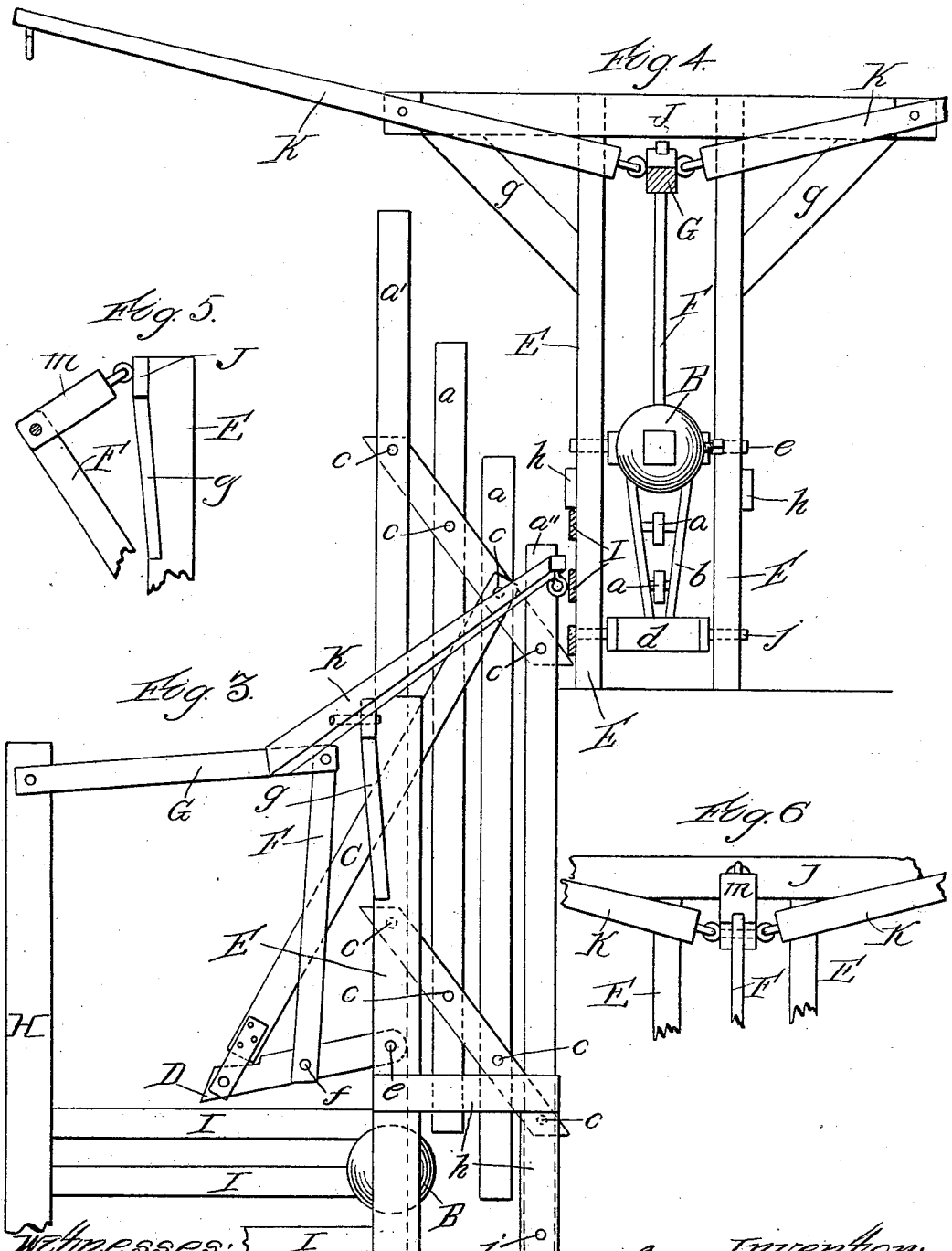

UNITED STATES PATENT OFFICE.

FRANK A. WHITNEY, OF WATERMAN, ILLINOIS.

GATE.

SPECIFICATION forming part of Letters Patent No. 538,307, dated April 30, 1895.

Application filed September 20, 1894. Serial No. 523,639. (No model.)

*To all whom it may concern:*

Be it known that I, FRANK A. WHITNEY, a citizen of the United States, residing at Waterman, De Kalb county, Illinois, have invented certain new and useful Improvements in Gates, of which the following is a specification, reference being had to the accompanying drawings, in which—

Figure 1 is a side elevation of the gate in its closed position, showing also the devices for operating the same. Fig. 2 is a similar view of the gate with the operating devices removed. Fig. 3 is a view similar to that of Fig. 1, but showing the gate raised. Fig. 4 is a section at line 4 4 of Fig. 1. Figs. 5 and 6 are details, showing a slight modification in a portion of the gate-operating mechanism, Fig. 5 being a side view, and Fig. 6 an end view.

My invention relates to gates of that class that are adapted to be opened by the occupant of a vehicle without getting out of the vehicle for that purpose, and that can be closed in like manner after having driven through.

It has for its object the construction of a gate of that class, that can be easily and quickly operated both to open and to close, that will be economical in construction, and that when opened will occupy such a little space as practically not to constitute any obstruction in the roadway to the passage of teams, and when closed will be locked in that position. All this I obtain by constructing the gate as shown in the drawings and as hereinafter fully described.

That which I claim as my invention will be pointed out in the claim.

In the drawings—A represents the gate proper, composed—in the construction shown, of a pair of strips $a'$ at the top, a pair of strips $a''$ at the bottom, single intermediate strips $a$, all of a length suitable to the roadway which it is desired to obstruct, and diagonal braces $b$, two of such braces being shown on each side of the strips $a$. These strips and braces are pivoted together in any suitable manner at the points indicated by $c$. As shown in Fig. 4, each pair of strips $a'$ and $a''$ are rather widely separated at their rear ends, the former pair being also somewhat longer than the other strips, and receiving between them near their ends a counter-weight to aid in operating the gate. The lower pair $a''$ are separated at their rear ends and braced by a short cross-piece $d$, as shown in Fig. 4.

C is the long arm of a toggle-lever pivoted to the forward lower portion of the gate and thence extending diagonally across the gate and between the pair of strips $a'$, being pivotally connected in any suitable manner to the shorter member, D, of the toggle.

E E are posts, one on each side of the gate A, and to which such gate is pivoted by a pivot $e$ passing through the posts and the pair of strips $a'$. On the same pivot $e$, and between the strips $a'$ in the construction shown, is pivoted the short member D of the toggle.

F is a bar pivoted at its lower end to the short member D of the toggle, the pivot $f$, being intermediate the ends of said short member D, and to the rear of the pivotal connection between said short member D and the long member C of the toggle lever. The upper end of this bar F is pivoted to one end of another bar, G, which extends back and is pivoted at its rear end to a post H, as clearly shown in Figs. 1 and 3.

I are strips extending from one of the posts E to the post H, and serving as braces for said posts.

J is a cross-bar secured to the posts E near their upper ends and braced, in the construction shown, by braces $g$.

K K are levers, each pivoted to the cross-bar J, one near each end of such bar. These levers are jointed at their inner ends in any suitable manner to the bar G, and extend diagonally toward the road-way across which the gate is thrown, so as to be readily operated by any person driving or riding up to such gate.

$h$ is a frame into which the lower part of the gate folds when the gate is elevated, and to which the lower pair of strips $a''$ of the gate are pivoted, as shown at $j$, such pivot being considerably forward of the other point $e$ at which the gate is attached. This frame $h$ serves to protect the gate from damage by wheels of vehicles that might strike against the gate were the frame not provided.

The means for locking my improved gate consists in extending the long toggle arm C so that it will project between two posts, one of such posts being shown at $i$; and in order that such extended end may be allowed to enter between such posts and be withdrawn therefrom, I provide for the connection between the lower end of the toggle member C and the gate by making a slot $k$ in such toggle member, in which slides a pin $l$ on the gate when the gate is moved into its closed or open position. The extended end of C projects beneath a short cross-piece $m$ secured to the two posts $i$.

To open the gate while on horseback or in a vehicle, the lever K that projects toward the party desiring to pass through the gate is pulled down, causing the bar G to rise and through the bar F operating the toggle-lever C D, so as to swing the free end of the gate up to a vertical or nearly vertical position. When the gate is about half elevated the short arm D is brought in line with the bar F, and, if the gate were raised slowly, a dead center might thus be caused, rendering it necessary for the operator to descend to the ground and force the gate farther back; but any such liability to sticking is avoided by the use of the weight B, which will swing the gate over beyond the point where the two parts D and F come in line with each other, thereby insuring the gate being carried clear back and away from the roadway. As shown, several holes are provided in the extended ends of the strips $a''$, which allows of the weight B being adjusted to any desired position to secure the best results. After the person who has opened the gate has ridden or driven through, he may close it in the same manner that it was opened, viz., by pulling down on the lever K that projects toward the side of the gate that he is on. The effect of such pulling on this lever K, when the gate is in its elevated position, is through the bars G and F to pull up the short member D of the toggle which swings on its pivot $e$, and through the long arm C of the toggle turn the gate A on its pivots $e$ and $j$ down across the road-way. In this operation the weight B acts to prevent the gate closing with such force as to cause injury.

When the gate is being elevated, the strips $a$, $a'$, $a''$ and $b$ turn on the pivot $c$, thus causing the long strips to be brought closer together so that the gate when in its raised position will be considerably narrower than when down, which is quite a desirable feature in many cases.

It will be understood that when one of the levers K is pulled it will, before the gate can commence to rise, draw back the bar C so as to free its locking end from the short crosspiece $m$, such action being permitted by the slot-and-pin connection described.

In Fig. 5 I have illustrated a slight modification in the gate operating mechanism, in which the pivoted bar G and the upright posts H are dispensed with. In lieu of such parts a short connecting block $m$ is employed, pivoted at its upper end by an eye, or in any other suitable manner, to the cross-bar J, and at its lower end pivoted to the upper end of the bar F, the levers K being also secured in a pivotal manner as shown to this block and the upper end of the bar F.

The principal parts of the gate, while capable of being advantageously constructed of wood, may, of course, be constructed of any other suitable material.

That which I claim as my invention, and desire to secure by Letters Patent, is—

In a gate, the combination with a frame and a gate proper pivoted thereto, of posts $i$, a toggle-lever the short and long arms of which are pivoted together and to the frame and gate proper respectively, the end of the long arm projecting beyond said gate proper and entering between the posts $i$, and a device for engaging the same when the gate is closed to lock it in that position, and means for operating said toggle lever to open and close the gate, substantially as described.

FRANK A. WHITNEY.

Witnesses:
H. ROBERTS,
R. R. BROWN.